United States Patent [19]

Ishizawa

[11] 4,387,936
[45] Jun. 14, 1983

[54] MAGNETIC BEARING FOR HIGH-SPEED ROTATION

[75] Inventor: Tadao Ishizawa, Tokyo, Japan

[73] Assignee: Kabushiki Kaisha Daini Seikosha, Tokyo, Japan

[21] Appl. No.: 305,364

[22] Filed: Sep. 24, 1981

[30] Foreign Application Priority Data

Oct. 9, 1980 [JP] Japan .................. 55-144183[U]

[51] Int. Cl.³ .............................................. F16C 39/00
[52] U.S. Cl. ................................................... 308/10
[58] Field of Search .................. 308/10; 310/261, 262, 310/264, 265, 267, 216, 217

[56] References Cited

U.S. PATENT DOCUMENTS

| | | | |
|---|---|---|---|
| 2,704,231 | 3/1955 | Goldsmith | 308/10 |
| 4,072,370 | 2/1978 | Wasson | 308/10 |
| 4,141,604 | 2/1979 | Habermann | 308/10 |
| 4,180,946 | 1/1980 | Heijenskjold et al. | 308/10 |

FOREIGN PATENT DOCUMENTS

| | | | |
|---|---|---|---|
| 987 | 11/1979 | European Pat. Off. | 308/10 |
| 2341766 | 2/1975 | Fed. Rep. of Germany | 308/10 |

Primary Examiner—R. Skudy
Attorney, Agent, or Firm—Robert E. Burns; Emmanuel J. Lobato; Bruce L. Adams

[57] ABSTRACT

A rotor armature assembly for an electromagnetic radial bearing for use in high rotational speed applications comprises a rotor armature fixedly connected to a rotor shaft. The rotor armature is formed of a plurality of annular magnetic plates each comprised of soft magnetic material, and a plurality of annular reinforcing plates each comprised of material having greater tensile strength than the soft magnetic material. The reinforcing plates are interposed between the magnetic plates and all of the plates are axially urged together so that adjoining plates are in frictional engagement with each other to form a laminated plate structure. The reinforcing plates frictionally restrain radial outward deformation of the magnetic plates due to centrifugal force during high speed rotation of the rotor armature assembly.

6 Claims, 3 Drawing Figures

MAGNETIC BEARING FOR HIGH-SPEED ROTATION

BACKGROUND OF THE INVENTION

The present invention relates to a rotor construction of a magnetic bearing for use with high-speed rotation machinery.

Magnetic bearings are utilized in machines rotated at high speed (e.g. a centrifugal separator, a turbo machine, etc.) and offer the advantages of no mechanical contact between the rotary and stationary parts, low friction torque and no need of lubrication. As shown in FIGS. 1 and 2, a radially controlled type bearing arranges an electromagnet 1 in the radial direction to control the attractive power of the electromagnet by an electric control device (not shown) so as to support a rotor 2 in an air gap between the electromagnet and the rotor. An iron core of the electromagnet 1 and a rotor armature 3 are made of laminated soft magnetic materials (mainly of silicon iron) having excellent electro-magnetic characteristics in order to minimize excess current loss.

In the electromagnet 1, which is stationarily fixed, the material of the laminated plate can be selected by taking into account only the electromagnetic characteristics.

In the rotor armature 3, however, it is necessary to select the material and to design the structure so that it can withstand the centrifugal force generated by the rotation thereof, as well as taking into account the electromagnetic characteristics. The conventional rotor armature has not achieved a satisfactory structural design capable of withstanding the centrifugal force since such designs only take into account the electromagnetic characteristics. Accordingly the conventional rotor has the limitation that the highspeed rotation depends on the tensile strength of the rotor armature, so that it is difficult to realize rotors capable of higher speed rotation. Although it is desirable to use a material having both excellent electro-magnetic and mechanical characteristics for the rotor armature, such materials are hard to obtain as a practical matter. It is an object of the present invention to eliminate the above-noted drawbacks and to realize a rotor capable of higher speed rotation and which is comprised of a soft magnetic laminated plate having an excellent electromagnetic characteristic in order to improve the electromagnetic conversion efficiency and which uses a material having an excellent mechanical strength in order to strengthen the mechanical strength of the rotor.

DETAILED DESCRIPTION OF PREFERRED EMBODIMENT

Figure 3:
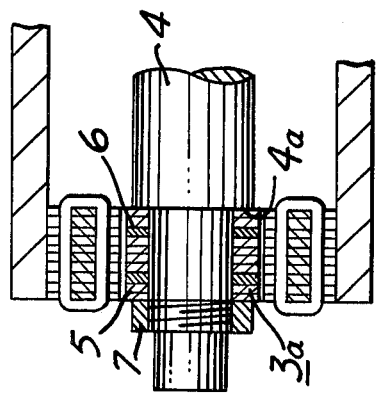
FIG. 3 shows a sectional view of an embodiment of a magnetic bearing according to the present invention.
Figure 2:
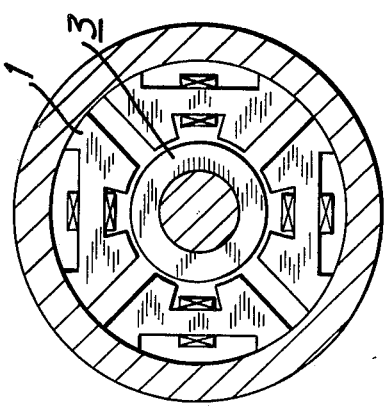
FIG. 2 shows a sectional view taken on line A-A' of FIG. 1.
Figure 1:
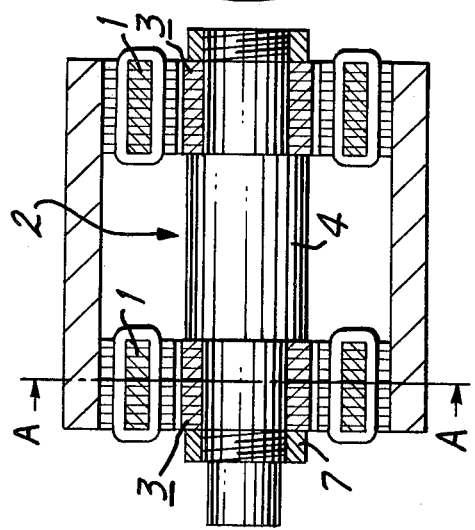
FIG. 1 shows a sectional view of the conventional magnetic bearing.

Hereinafter the present invention will be illustrated in conjunction with the embodiment shown in FIG. 3. A laminated rotor armature 3a is connected to a rotor shaft 4 by means of a threaded nut 7. The armature 3a is comprised of a set of soft annular magnetic plates having an excellent electromagnetic characteristic and a set of annular reinforcing plates of comprised material having excellent mechanical strength, such as a spring steel, a maraging steel (made by INCO in USA), or the like. The tensile strengths are respectively 120 kg/mm$^2$ and 180 kg/mm$^2$: about 3 to 4.5 times higher than that of silicon iron.) As shown in FIG. 3, the rotary shaft 4 has an axial section of reduced diameter on which are disposed the annular plates 5 and 6. The reduced diameter section terminates in an annular wall portion 4a and the nut 7, when threaded onto the shaft 4, axially presses the plates 5 and 6 together against the annular wall portion 4a to establish frictional engagement between adjoining plates.

When the rotor armature 3a is rotated, the soft magnetic plates 5 and the reinforcing plates 6 are radially deformed by the action of centrifugal force.

The amount of deformation of the reinforcing plates 6 is smaller than that of the soft magnetic plates 5 because of the superior mechanical strength of the plates 6. Therefore, since the soft magnetic plates 5 are disposed on either side of each of the reinforcing plates 6 in the axial direction of the rotor shaft 4, large deformation of the soft magnetic plates 5 is restrained by the frictional force generated between the adjoining reinforcing plates 6 and the soft magnetic plates 5 which are clamped into frictional contact by the nut 7. As illustrated, according to the present invention, radial deformation of the soft magnetic plates 5 due to centrifugal force during rotation of the rotor 2 is restrained by the frictional engagement of the soft magnetic plates 5 with the reinforcing plates 6 and thereby the limited rotational speed above which in the conventional structures would cause destruction of the soft magnetic plates is effectively raised.

If non-magnetic materials (e.g. a stainless steel) are used for the material of the reinforcing plates, the rigidity of the rotor armature against displacement in the axial direction is improved.

Although the nut 7 has been shown as being used for clamping the rotor armature 3a, the armature may by fixed in place by pressing a ring onto the rotor shaft 4 in the axial direction in place of the nut 7.

I claim:

1. A rotor armature assembly for an electromagnetic radial bearing for use in high rotational speed applications, the rotor armature assembly comprising: a rotary shaft, a plurality of annular magnetic plates each comprised of soft magnetic material and disposed in axial alignment on the rotary shaft, and means including a plurality of annular steel reinforcing plates each comprised of material having greater mechanial strength than the soft magnetic material of said magnetic plates and disposed on the rotary shaft between some of the annular magnetic plates and in frictional engagement therewith for frictionally restraining radial outward deformation of the annular magnetic plates due to centrifugal force during high speed rotation of the rotor armature assembly.

2. A rotor armature assembly according to claim 1; wherein the reinforcing plates are comprised of a steel selected from a group consisting of spring steel and maraging steel spring steel or maraging steel.

3. A rotor armature assembly according to claim 1; wherein the reinforcing plates are comprised of steel having a tensile strength greater than about 120 Kg/mm$^2$.

4. A rotor armature assembly according to claim 1; wherein the reinforcing plates are comprised of steel having a tensile strength on the order of 180 Kg/mm$^2$.

5. A rotor armature assembly according to claim 1; wherein the means for frictionally restraining radial outward deformation of the annular magnetic plates includes means for axially urging together the annular magnetic and reinforcing plates to establish frictional engagement therebetween.

6. A rotor armature assembly according to claim 5; wherein the rotory shaft has an axial section of reduced diameter which terminates at one end in an annular wall portion of the rotary shaft, the annular magnetic and reinforcing plates being disposed on the reduced diameter axial section, and means for axially pressing the annular magnetic and reinforcing plates together against the annular wall portion to establish sufficient frictional engagement therebetween to frictionally restrain radial outward deformation of the annular magnetic plates due to centrifugal force during high speed rotation of the rotor armature assembly.

* * * * *